US009695888B2

(12) United States Patent
Cho

(10) Patent No.: US 9,695,888 B2
(45) Date of Patent: Jul. 4, 2017

(54) METHOD FOR PREVENTING OVERHEATING OF CLUTCH FOR VEHICLE

(71) Applicant: Hyundai Motor Company, Seoul (KR)

(72) Inventor: Woon Ki Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 14/942,387

(22) Filed: Nov. 16, 2015

(65) Prior Publication Data

US 2017/0009823 A1 Jan. 12, 2017

(30) Foreign Application Priority Data

Jul. 7, 2015 (KR) .......................... 10-2015-0096361

(51) Int. Cl.
F16D 48/06 (2006.01)

(52) U.S. Cl.
CPC ...... *F16D 48/06* (2013.01); *F16D 2500/1045* (2013.01); *F16D 2500/10412* (2013.01); *F16D 2500/30404* (2013.01); *F16D 2500/50287* (2013.01); *F16D 2500/50825* (2013.01); *F16D 2500/5106* (2013.01)

(58) Field of Classification Search
CPC ........... F16D 48/06; F16D 2500/10412; F16D 2500/1045; F16D 2500/30404; F16D 2500/50287; F16D 2500/50825; F16D 2500/50841; F16D 2500/5106; F16H 2061/205; F16H 2312/04
See application file for complete search history.

(56) References Cited

U.S. PATENT DOCUMENTS

| 5,823,912 A * | 10/1998 | Fischer .................. F16D 25/123 192/82 T |
| 2005/0283298 A1* | 12/2005 | Ochi ..................... B60W 10/02 701/67 |
| 2006/0004506 A1* | 1/2006 | Stehle .................. B60W 10/02 701/67 |
| 2016/0082967 A1* | 3/2016 | Kam ............... B60W 30/18027 701/70 |
| 2016/0332627 A1* | 11/2016 | Yoon ................... B60W 30/186 |

FOREIGN PATENT DOCUMENTS

| JP | 2003-262240 A | 9/2003 |
| JP | 2006-64039 A | 3/2006 |
| JP | 2007-57043 A | 3/2007 |
| JP | 2012-91603 A | 5/2012 |
| JP | 2013-224141 A | 10/2013 |
| JP | 5454699 B2 | 1/2014 |
| KR | 10-2010-0113241 A | 10/2010 |
| KR | 10-2014-0010319 A | 1/2014 |

* cited by examiner

*Primary Examiner* — Terry Chau
(74) *Attorney, Agent, or Firm* — Morgan Lewis & Bockius LLP

(57) ABSTRACT

A method for preventing overheating of a clutch for a vehicle may include determining, by a controller, whether a state of the vehicle satisfies a hill hold condition; acquiring, by the controller, a temperature of a clutch between an engine and a transmission when the hill hold condition is satisfied; applying, by the controller, a first torque having a predetermined square wave shape to the clutch when the temperature of the clutch reaches a first temperature; and applying, by the controller, a second torque having a predetermined sine wave shape to the clutch when the temperature of the clutch reaches a second temperature higher than the first temperature.

7 Claims, 3 Drawing Sheets

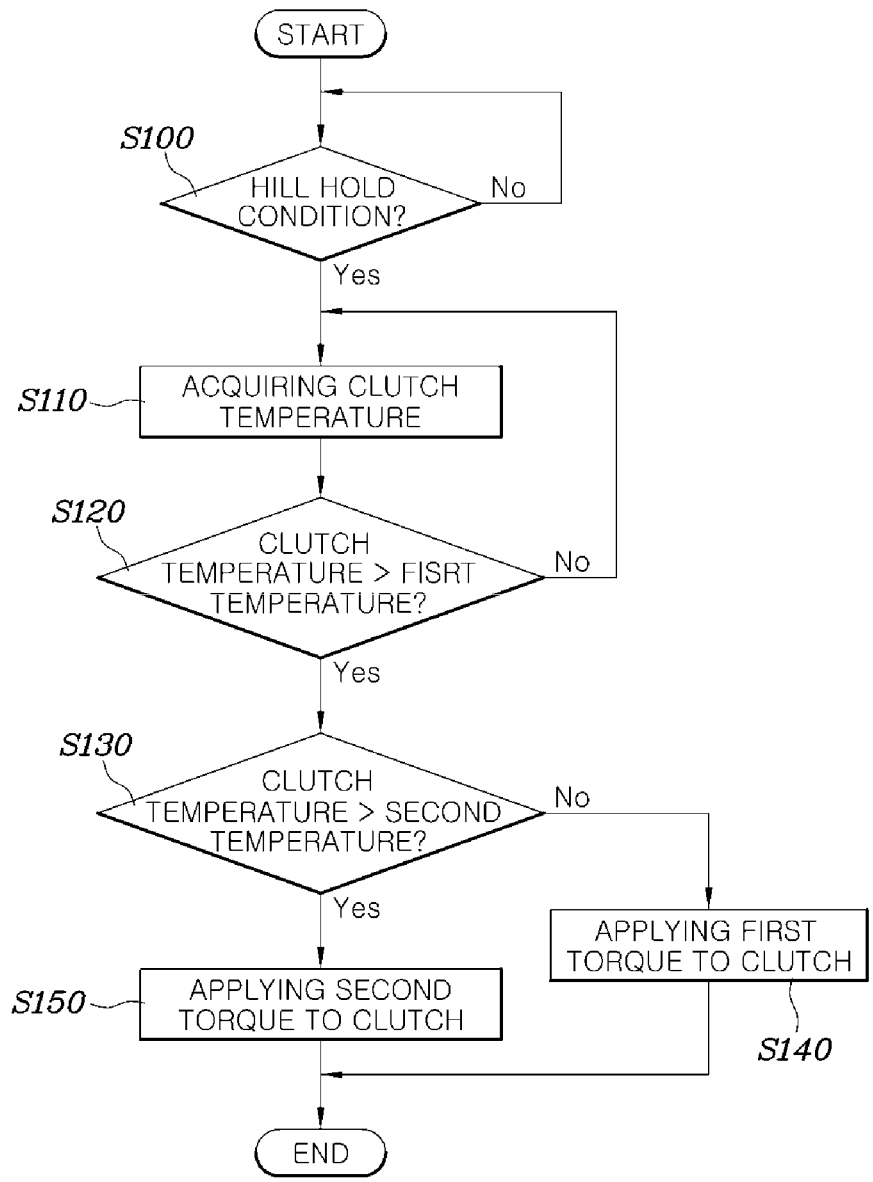

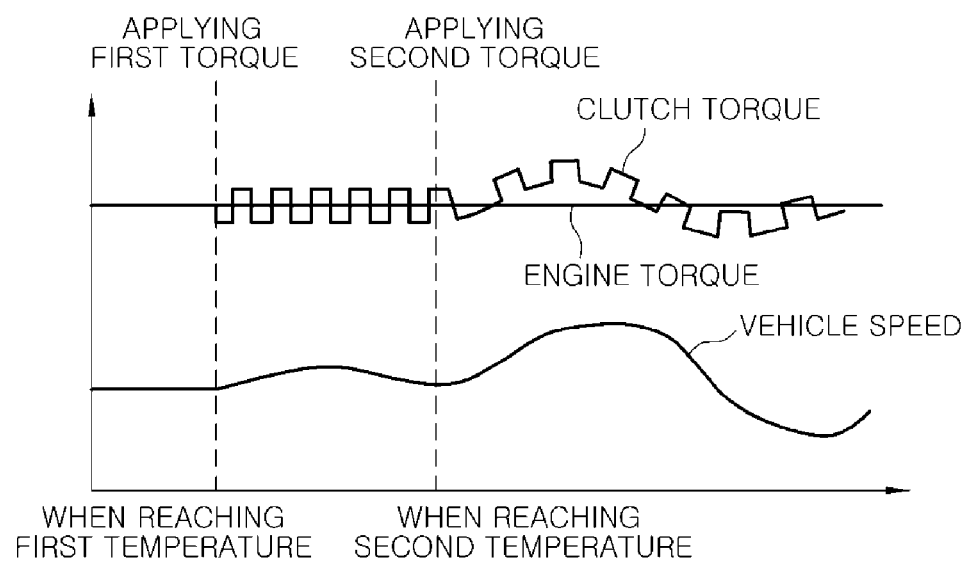

METHOD FOR PREVENTING OVERHEATING OF CLUTCH FOR VEHICLE

CROSS REFERENCE TO RELATED APPLICATION

The present application claims priority to Korean Patent Application Number 10-2015-0096361 filed Jul. 7, 2015, the entire contents of which is incorporated herein for all purposes by this reference.

BACKGROUND OF THE INVENTION

Field of the Invention

The present invention relates to a method for preventing overheating of a clutch for a vehicle in case of stopping the vehicle on an uphill road with only manipulation of an accelerator pedal.

Description of Related Art

A clutch disposed between an engine and a transmission is classified as dry type and wet type. The dry type clutch means that surfaces of its clutch plates are dry and oil does not exist in its working portion. This type of clutch mainly applies to a manual transmission of a vehicle. That is, the dry type clutch is likely to get burning damage due to heating generated by friction or abrasion since oil does not exist in the working portion of the clutch.

Generally, the dry type clutch has been applied to a Dual Clutch Transmission (DCT) as an automated manual transmission. When a hill hold situation in which a vehicle with the DCT is in a stationary state on a uphill road only by manipulation of an accelerator pedal by a driver is formed, an overheating of the clutch occurs by slip of the clutch from the difference between a target revolution number of an engine and a revolution number of an input shaft.

According to this, a technique warning a driver in advance using a jolting logic in order to assure the durability of a clutch in the hill hold situation is disclosed. The jolting logic is a control logic warning a driver of the overheating possibility of a clutch with generating a back and forth vibration of a vehicle through applying a clutch torque having a square wave shape when a hill hold condition is satisfied.

However, in case that the hill hold situation continues regardless of the intention of the driver after warning with the jolting logic, the temperature of the clutch reaches a warning high temperature at an elapse time of about 1 minute, and the clutch is open compulsorily after further 30 seconds. Therefore, the driver still undergoes an inconvenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for preventing overheating of a clutch for a vehicle that can prevent the heat generating of the clutch by inducing the vehicle movement or a brake actuation by a driver via making the vehicle stop difficult on an uphill road only by manipulation of an accelerator pedal, with varying a clutch torque according to the clutch temperature when the hill hold condition is satisfied.

According to one aspect, a method for preventing overheating of a clutch for a vehicle according to an exemplary embodiment of the present disclosure may include determining, by a controller, whether a state of the vehicle satisfies a hill hold condition; acquiring, by the controller, a temperature of a clutch between an engine and a transmission when the hill hold condition is satisfied; applying, by the controller, a first torque having a predetermined square wave shape to the clutch when the temperature of the clutch reaches a first temperature; and applying, by the controller, a second torque having a predetermined sine wave shape to the clutch when the temperature of the clutch reaches a second temperature higher than the first temperature.

The first torque may be a square wave shaped torque repeatedly changed by a maximum value higher than a target value constantly during a predetermined time and a minimum value lower than the target value constantly during the predetermined time and the target value may be a target clutch torque depending on a displacement amount of an accelerator pedal.

The second torque may be a sine wave shaped torque progressing along the target value of the first torque having the square wave shape.

The controller may be a Transmission Control Unit (TCU).

The controller may stop applying the first torque or the second torque when a brake is operated on during the application of the first torque or the second torque.

The controller may stop applying the first torque or the second torque when the hill hold condition is not satisfied during the application of the first torque or the second torque.

The controller may determine that the hill hold condition is satisfied when a displacement amount of an accelerator pedal is bigger than a predetermined amount and the vehicle speed is zero.

According to the above mentioned method for preventing overheating of a clutch for a vehicle, in case of stopping a vehicle on an uphill road only by manipulation of an accelerator pedal, inducing of moving vehicle or using brake may prevent the clutch from overheating.

Further, it is possible to prevent the clutch from overheating without any additional device, and to remove complaint factors of a customer from a cluster warning or opening of a clutch.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a view illustrating a method for preventing overheating of a clutch for a vehicle according to an exemplary embodiment of the present disclosure; and FIG. 3 is a graph depicting the first torque and the second torque according to an exemplary embodiment of the present disclosure.

Figure 1:
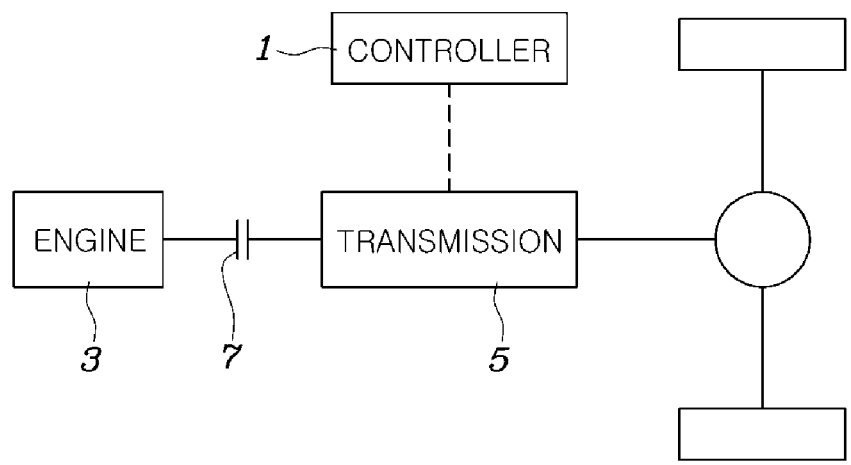
FIG. 1 is a view illustrating a device for preventing overheating of a clutch for a vehicle according to an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a method for preventing overheating of a clutch for a vehicle according to exemplary embodiments of the present invention will be described in detail with reference to the accompanying drawings.

FIG. 1 is a view illustrating a device for preventing overheating of a clutch for a vehicle according to an exemplary embodiment of the present disclosure, FIG. 2 is a view illustrating a method for preventing overheating of a clutch for a vehicle according to an exemplary embodiment of the present disclosure, and FIG. 3 is a graph depicting the first torque and the second torque according to an exemplary embodiment of the present disclosure.

Referring to FIGS. 1 to 3, A method for preventing overheating of a clutch for a vehicle may include determining, by a controller 1, whether a state of the vehicle satisfies a hill hold condition (S100), acquiring, by the controller 1, a temperature of a clutch 7 between an engine 3 and a transmission 5 when the hill hold condition is satisfied (S110), applying, by the controller 1, a first torque having a predetermined square wave shape to the clutch when the temperature of the clutch 7 reaches a first temperature (S140), and applying, by the controller 1, a second torque having a predetermined square wave shape to the clutch when the temperature of the clutch 7 reaches a second temperature higher than the first temperature (S150).

In this embodiment, the hill hold condition means a state that a driver tries to prevent a vehicle from rolling backwards on an uphill road with only manipulation of an accelerator pedal.

That is, the controller 1 may acquire the temperature of the clutch 7 in order to determine whether an overheating occurs at the clutch 7 when it is determined that a vehicle is at a hill hold situation that a driver stops the vehicle on the uphill road with only manipulation of an accelerator pedal. Thereafter, the controller 1 may determine that the temperature of the clutch 7 reaches a first temperature (S120), and also may determine that the temperature of the clutch 7 reaches a second temperature higher than the first temperature (S130).

In case that the temperature of the clutch 7 reaches the first temperature, i.e. 170° C. lower than the second temperature, the controller 1 applies a first torque having a square wave shape to the clutch 7 with determining a possibility of overheating of the clutch 7. When the first torque is applied to the clutch 7, the driver can recognize the possibility of overheating of the clutch 7 via a back and forth vibration of the vehicle.

Further, when the temperature of the clutch 7 reaches the second temperature, i.e. 250° C., the controller 1 applies the second torque having a sine wave shape to the clutch 7 with determining a high overheating possibility of the clutch 7. When the second torque is applied to the clutch 7, though a driver makes a displacement amount of an accelerator pedal constant, a back and forth minute moving of the vehicle makes it difficult to maintain the stopped state of the vehicle on the uphill road without using of a brake.

Therefore, an inducing of moving forward or braking of a vehicle by a driver with the applying torque is capable of preventing from overheating of a clutch, in case of a hill hold situation stopping a vehicle on the hill road with only a manipulation of an accelerator pedal. The constrained values of the first temperature and the second temperature as mentioned above are only for examples and may be variable according to vehicles, designers, or driving environments.

At this time, the controller 1 may be a Transmission Control Unit (TCU) which is able to apply the first torque or the second torque to the clutch 7 through a transmission 5.

Meanwhile, the first torque may be a square wave shaped torque repeatedly changed by a maximum value higher than a target value constantly during a predetermined time and a minimum value lower than the target value constantly during the predetermined time, and the target value may be a target clutch torque depending on a displacement amount of an accelerator pedal.

That is, when the temperature of the clutch 7 reaches the first temperature, the controller 1 applies to the clutch 7 a clutch torque having a square wave shape varying between high and low constantly based on the target clutch torque until the temperature of the clutch reaches the second temperature.

Referring to FIG. 3, the controller 1 applies the target torque to the clutch 7 without additional torque before the temperature of the clutch 7 reaches the first temperature, even though the vehicle satisfies the hill hold condition. However, when the temperature of the clutch 7 reaches the first temperature, applying the first torque having a square wave shape to the clutch 7 makes the clutch torque varying between high and low in comparison to engine torque. When the clutch torque is higher than the engine torque, the vehicle moves forward minutely on the uphill road. When the clutch torque is lower than the engine torque, the vehicle rolls down backwards minutely on the uphill road. According to this, a slight vibration of the vehicle can be occurred on the uphill road. Here, the predetermined time of the first torque affects the vibration of the vehicle, and may be set as a short time at a level of the vibration of the vehicle. For example, the predetermined time can be set at less than 1 second.

Therefore, when a vehicle satisfies the hill hold condition, applying the clutch torque having a square wave shape to the clutch 7 can inform a driver of the overheating of the clutch 7.

Also, the second torque may be a sine wave shaped torque progressing along the target value of the first torque having the square wave shape.

That is, when the temperature of the clutch 7 reaches the second temperature, the controller 1 may apply to the clutch 7 a clutch torque having a sine wave shape based on the target clutch torque as the center with a regular cycle. At this time, the second torque may include the square wave characteristic of the first torque.

The controller 1, as shown in FIG. 3, applies to the clutch 7 the second torque formed with uniting the square wave shape and the sine wave shape varying between high and low in comparison to an engine torque with a constant cycle, in case that the temperature of the clutch 7 reaches the second temperature, and thus, the vehicle is moved back and forth minutely on the uphill road. In this case, maintaining of the displacement amount of an accelerator pedal by a driver cannot remain the vehicle in a stationary state on the uphill road, so that the driver can be induced to move the vehicle by actuating a brake, or by increasing or decreasing the displacement amount of an accelerator pedal.

Therefore, it is possible to prevent the clutch from overheating occurring by stopping a vehicle on a hill only by an accelerator pedal without any warning device.

Meanwhile, the controller 1 may stop applying the first torque or the second torque when a brake is operated on during performing applying the first torque (S140) or applying the second torque (S150).

That is, the controller 1 applies the first torque to the clutch 7 by determining an overheating of the clutch 7, so that a driver is induced to recognize the overheating of the clutch 7 or the controller 1 applies the second torque to the clutch in order to make it difficult to remain the vehicle at the hill hold state with only manipulation of an accelerator pedal. At this time, when the driver recognizes the overheating of the clutch 7 and actuates the brake, it may be stopped to apply the first torque or the second torque since any additional warning is not necessary.

Accordingly, it is possible to prevent occurring of a bad feeling by an unnecessary back and forth vibration of the vehicle by applying the first torque or the second torque to the clutch 7 through the controller 1, even though the driver actuates the brake.

Further, the controller 1 may stop applying the first torque or the second torque when the hill hold condition is not satisfied during performing applying the first torque (S140) or applying the second torque (S150). That is, in case that the driver recognizes an overheating of the clutch 7 and tries to move the vehicle, the controller 1 may stop applying the first torque or the second torque since the hill hold condition is not satisfied.

Therefore, it is possible to prevent from deterioration of a drive-ability of a driver occurring by applying the first torque or the second torque consistently to the clutch 7 through the controller 1 even though the driver moves the vehicle.

Meanwhile, the controller 1 may consider the hill hold condition satisfied when a displacement amount of an accelerator pedal is bigger than a predetermined amount and the vehicle speed is zero.

The controller 1 may receive a displacement amount of an accelerator pedal from Throttle Position Sensor (TPS) and receive information of a vehicle speed from a vehicle speed sensor. The hill hold situation that a vehicle is at a stationary state on the uphill road by only manipulation of an accelerator pedal may be determined in case that the vehicle speed is zero even though the driver manipulates the accelerator pedal in a displacement amount larger than a predetermined displacement amount. Besides, the controller 1 may receive characteristics of an engine RPM from the engine 3 and an inclination of a road from an inclination sensor, etc., and determine whether the hill hold condition is satisfied based on the characteristics.

According to the above mentioned method for preventing overheating of a clutch for a vehicle, in case of stopping a vehicle on the uphill road only by manipulation of an accelerator pedal, it is possible to prevent the clutch from overheating by inducing of moving vehicle or using brake.

Further, it is possible to prevent the clutch from overheating without any additional device, and to remove complaint factors of a customer from a cluster warning or opening of a clutch.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for preventing overheating of a clutch for a vehicle comprising:
   determining, by a controller, whether a state of the vehicle satisfies a hill hold condition;
   acquiring, by the controller, a temperature of the clutch between an engine and a transmission when the hill hold condition is satisfied;
   applying, by the controller, a first torque having a predetermined square wave shape to the clutch when the temperature of the clutch reaches a first temperature; and
   applying, by the controller, a second torque having a predetermined sine wave shape to the clutch when the temperature of the clutch reaches a second temperature higher than the first temperature.

2. The method for preventing overheating of the clutch for the vehicle of claim 1, wherein the first torque is a square wave shaped torque repeatedly changed by a maximum value higher than a target value constantly during a predetermined time and a minimum value lower than the target value constantly during the predetermined time; and
   the target value is a target clutch torque depending on a displacement amount of an accelerator pedal.

3. The method for preventing overheating of the clutch for the vehicle of claim 2, wherein the second torque is a sine wave shaped torque progressing along the target value of the first torque having the square wave shape.

4. The method for preventing overheating of the clutch for the vehicle of claim 1, wherein the controller is a Transmission Control Unit (TCU).

5. The method for preventing overheating of the clutch for the vehicle of claim 1, wherein the controller stops applying the first torque or the second torque when a brake is operated on during performing applying the first torque or the second torque.

6. The method for preventing overheating of the clutch for the vehicle of claim 1, wherein the controller stops applying the first torque or the second torque when the hill hold condition is not satisfied during performing applying the first torque or the second torque.

7. The method for preventing overheating of the clutch for the vehicle of claim 1, wherein the controller determines that the hill hold condition is satisfied when a displacement amount of an accelerator pedal is bigger than a predetermined amount and a vehicle speed is zero.

\* \* \* \* \*